United States Patent [19]

Gutknecht et al.

[11] Patent Number: 5,676,817
[45] Date of Patent: Oct. 14, 1997

[54] PROCESS FOR THE PRODUCTION OF PURE SOLUTIONS OF TUNGSTEN AND MOLYBDENUM

[75] Inventors: Wilfried Gutknecht, Goslar; Wolfgang Mathy, Langelsheim, both of Germany

[73] Assignee: H.C. Starck, GmbH & Co. KG, Goslar, Germany

[21] Appl. No.: 577,255

[22] Filed: Dec. 22, 1995

[30] Foreign Application Priority Data

Jan. 3, 1995 [DE] Germany ............. 195 00 057.9

[51] Int. Cl.$^6$ ............. C22B 34/34; C22B 34/36
[52] U.S. Cl. ............. 205/477; 205/560; 205/564; 205/770; 423/55; 423/56; 423/421
[58] Field of Search ............. 205/477, 770, 205/560, 564; 423/56, 55, 421

[56] References Cited

U.S. PATENT DOCUMENTS 3,947,332 3/1976 Vanderpool et al. ............. 205/477
4,654,131 3/1987 Verbaan ............. 204/98
4,975,167 12/1990 Vadasdi et al. ............. 204/182.4

FOREIGN PATENT DOCUMENTS

| 0192426A3 | 2/1986 | European Pat. Off. |
| 0219787A3 | 10/1986 | European Pat. Off. |
| 0389661A1 | 3/1989 | European Pat. Off. |
| 19500057C1 | 1/1995 | Germany |

OTHER PUBLICATIONS

WPI/Derwent abstract of Russian Patent SU1836466 A3 to Kalkov, A., et al Aug. 1993.
WPI/Derwent abstract of Chinese patent CN1084575 A to Gong, B.; Mar. 1994.

*Primary Examiner*—Aron S. Phasge
*Attorney, Agent, or Firm*—Jerry Cohen

[57] ABSTRACT

Process for the production of pure tungsten and/or molybdenum solutions from sources, such as alkaline decomposition solutions, which are contaminated with tantalum, niobium, titanium, aluminium, tin, arsenic, phosphorus and/or silicon, by application of a three stage purification process of pH reduction, anion exchange and membrane electrolysis.

3 Claims, No Drawings

PROCESS FOR THE PRODUCTION OF PURE SOLUTIONS OF TUNGSTEN AND MOLYBDENUM

BACKGROUND OF THE INVENTION

The present invention relates to a process for the purification of pure tungsten and/or molybdenum decomposition solutions which are contaminated with tantalum, niobium, titanium, aluminium, tin, arsenic, phosphorus and silicon to thus produce pure tungsten and/or molybdenum solutions.

Alkali metallate solutions may be obtained from starting materials containing tungsten and/or molybdenum such as ores, scrap, recycled materials by various decomposition processes with alkalies such as pressure leaching, calcination or fusion decomposition. Depending upon the starting material, these alkaline solutions with pH values of 13 to 14 are contaminated with tantalum, niobium, titanium, tin, arsenic, phosphorus, silicon and/or aluminium.

These contaminants have hitherto been precipitated out by reducing the pH value to 8 to 10 with mineral acid, arsenic and phosphorus having also been precipitated out by the addition of magnesium and/or aluminium salts.

According to published European application EP-A 219 787, so-called electrolytic acidification constitutes a further option for reducing pH. However, due to the contaminants present in the decomposition liquors, there are problems with the membrane electrolysis described in this document due to the formation of deposits on the anodes and dogging of the membranes due to precipitates and sediments, particularly in severely contaminated solutions.

Adjusting pH with mineral acids has the disadvantage that a large quantity of neutral salts is produced which must be disposed of on completion of processing.

However, even when phosphorus, arsenic and silicon are precipitated by adding magnesium and/or aluminium salts at approximately pH 9, foreign salts are produced which constitute an additional unwanted salt load in the effluents. Moreover, arsenic cannot be completely separated.

The object of the present invention is thus to provide a method for purifying alkaline molybdate and/or tungsten decomposition solutions which are contaminated specifically with tantalum, niobium, titanium, tin, arsenic, phosphorus, silicon. It is a further object to process such solutions to yield pure molybdenum and/or tungstate solutions without adding foreign salts and mineral acids.

SUMMARY OF THE INVENTION

An environmentally-friendly process has now been found according to the invention by performing three processing stages in succession, which process makes it possible to produce pure tungsten and molybdenum compounds from alkaline decomposition solutions, which compounds are suitable as starting materials for the isolation of pure metals and/or metal compounds:

in the first stage, pH reduction by introduction of $CO_2$ gas,
in the second stage, an anion exchange process and
in the third stage, membrane electrolysis.

The present invention thus provides a three stage process for the production of pure tungsten and/or molybdenum solutions from alkaline decomposition solutions, which are contaminated with tantalum, niobium, titanium, tin, arsenic, phosphorus, silicon. In a first stage, the alkaline decomposition solutions are gasified with $CO_2$ until a pH of 8 to 10 is established in the solutions, wherein the elements tantalum, niobium, aluminium, titanium and tin are partially separated. In a second stage, the residual contaminants together with arsenic, phosphorus and silicon are completely removed with an anion exchanger at pH 6 to 10. In a third stage, the purified solution is further treated by membrane electrolysis by means of cation-selective membranes, wherein NaOH is recovered on the cathode side and $CO_2$ gas on the anode side.

The third stage of the process may preferably be followed by further post-treatment of the metallate solutions by solvent extraction, for example in order to isolate ammonium salts of tungstic or molybdic acid in pure form.

The process according to the invention produces no, or greatly reduced, quantities of the neutral salts $Na_2SO_4$, NaCl and moreover allows the NaOH, used to decompose the raw materials and the $CO_2$ required for neutralization, to be recirculated into the process.

During $CO_2$ gasification and pre-purification in the first stage, contaminated alkali metallate solutions from alkali decomposition are gasified with $CO_2$ to a pH value of between 8 and 10. The elements aluminium, tin, silicon, tantalum, niobium and titanium partially precipitate out within this pH range and may be separated by filtration.

In the subsequent purification by ion exchange, the remaining contaminants arsenic, phosphorus and silicon and the residues of the above-stated elements may additionally largely be separated from the filtrate at pH 8 with a weakly basic anion exchanger. The contaminants arsenic, phosphorus and silicon may thus be virtually completely separated from, for example, tungsten liquors. This separation is thus distinctly more effective than precipitation by way of addition of magnesium or aluminium.

In the subsequent membrane electrolysis for acidification, the solution, from which tantalum, niobium, titanium, tin, arsenic, phosphorus, aluminium and silicon have been removed, may be acidified to an acidic pH range by membrane electrolysis. Cation-selective membranes are in particular used at this stage.

Sodium hydroxide solution is advantageously recovered on the cathode side and it may be reused in decomposing the raw materials.

Due to the reduction of the pH value to <7 on the anode side, $CO_2$ may also be recovered here and recirculated.

Post-purification by solvent extraction may optionally be performed, wherein such pre-purified and acidified solutions may be further processed using known processes, such as for example ion exchange (by solvent extraction or using solid ion exchange resins), or by precipitation to yield the pure starting materials for the production of metals or metal compounds.

DETAILED DESCRIPTION OF PREFERRED EMBODIMENTS

The invention is illustrated below by way of a non-limiting example.

EXAMPLE

Stage 1

$CO_2$ gasification, pre-neutralization:

An alkaline tungstate liquor from fusion decomposition of hard metal residues containing 156 g/l of W, 160 mg/l of Al, 88 mg/l of Nb, 73 m/l of Ta and 42 mg/l of Ti was diluted to approximately twice its volume with water and gasified with $CO_2$ to a pH value of 8.2 through sintered glass plate. A small quantity of precipitate was formed during gasification which substantially consisted of Al, Ti, Ta, Nb and Si and still contained approximately 15 wt. % of tungsten.

Stage 2 a) Post-purification by ion exchange:

In the following stage, the filtrate from pre-neutralisation with $CO_2$ containing approximately 70 g/l of tungsten and the remaining contaminants is passed through an exchanger resin with 300 ml of the weakly basic anion exchanger LEWATIT MP 62 (OH ion form) from BAYER AG. Breakthrough of the exchanger column was achieved with approximately 4 liters of the solution. The raffinate containing tungsten had a concentration of 65 g/l of tungsten and was already largely free of all but traces of contaminants.

b) Tungstate recirculation from the filtrate

The anion exchanger was then eluted with sodium hydroxide solution and so returned to the OH form. The strongly alkaline eluate (approximately 1 l) still contained, in addition to the principal quantity of the contaminants introduced with the decomposition liquor, approximately 55 g/l of tungsten in dissolved form. This waste liquor was gasified with $CO_2$ as a small fractional quantity and, once the precipitated contaminants had been filtered out, was returned to the circuit before stage 1 in order to recover the entrained tungsten.

Stage 3

Acidification of tungstate solutions, membrane electrolysis:

The purified solution from stage 2 was circulated through a membrane electrolysis cell (membrane material: Nafion 90209 from DU PONT). At an initial cell voltage of 4.6 V, a current intensity of 20 A was achieved (current density: 0.4 A/cm$^2$). After 8 hours, at a final value of 8 V on the anode side, a pH value of approximately 2 was reached and electrolysis terminated. The liberated stream of gaseous $CO_2$ was not collected on this test scale and also not returned to stage 1, although this would be practicable and sensible for continuous operation of the process.

A sodium hydroxide solution of a concentration of approximately 100 g/l of NaOH was produced on the cathode side, which may be used operationally for eluting and regenerating the anion exchanger or for leaching the raw materials.

Further processing of the purified solution:

A very pure ammonium paratungstate was then isolated in a known manner from the acidic tungstate solution by solvent extraction with secondary amines. Analysis of the final product revealed 69.5% of tungsten with the following contaminants: <3 ppm of Al, <5 ppm of As, <3 ppm of Ca, <2 ppm of Co, <1 ppm of Cu, <5 ppm of P, <10 ppm of Si, 1 ppm of K, 1 ppm of V, 6 ppm of Fe, 2 ppm of Na.

We claim:

1. Three stage process for the production of pure tungsten and/or molybdenum solutions from alkaline decomposition solutions, which are contaminated with one or more of tantalum, niobium, titanium, tin, arsenic, aluminium, phosphorus, silicon, characterized in that (a) in a first stage, the alkaline decomposition solutions are gasified with $CO_2$ until a pH of 8 to 10 is established in the solutions, so that the elements tantalum, niobium, aluminium, titanium and tin are partially separated, (b) in a second stage, the residual contaminants, together with arsenic, aluminium, phosphorus and silicon, are completely removed with an anion exchanger at pH 6 to 10 and, (c) in a third stage, the purified solution is further treated by membrane electrolysis by means of cation-selective membranes, whereby NaOH is recovered on the cathode side and $CO_2$ gas on the anode side.

2. Process according to claim 1, characterized in that, in a further (fourth) stage, the metallate solutions are post-purified by solvent extraction.

3. Process for the production of tungsten and/or molybdenum containing solutions comprising the steps of modifying pH of an alkaline decomposition solution to an 8 to 10 pH range, subjecting the solution to anion exchange at pH 6 to 10 and then to membrane electrolysis using cation selective membranes, the pH adjustment being effected without addition of mineral acids or salts.

* * * * *